United States Patent [19]
Preissinger et al.

[11] 4,012,817
[45] Mar. 22, 1977

[54] METHOD OF MAKING A CAPACITOR

[75] Inventors: Karl-Heinz Preissinger, Taufkirchen; Ulrich Wehnelt, Starnberg, both of Germany

[73] Assignee: Siemens Aktiengesellschaft, Berlin & Munich, Germany

[22] Filed: June 26, 1975

[21] Appl. No.: 590,432

[30] Foreign Application Priority Data

June 27, 1974 Germany .................... 2431044

[52] U.S. Cl. .................... 29/25.42; 361/313
[51] Int. Cl.² .................... H01G 4/18; H01G 7/00
[58] Field of Search ........... 29/25.42; 317/258, 261

[56] References Cited

UNITED STATES PATENTS

| | | | |
|---|---|---|---|
| 2,226,589 | 12/1940 | Smyers | 317/258 X |
| 3,178,623 | 4/1965 | Robinson | 317/258 |
| 3,851,363 | 12/1974 | Booe | 29/25.42 |
| 3,857,074 | 12/1974 | Heywang | 317/258 |

Primary Examiner—E. A. Goldberg
Attorney, Agent, or Firm—Hill, Gross, Simpson, Van Santen, Steadman, Chiara & Simpson

[57] ABSTRACT

A layer or stack type capacitor having a covering foil, and adhesion-imparting layer disposed on the surface of the covering foil, a first electrically conductive layer disposed on the surface of the adhesion-imparting layer and a dielectric and second electrically conductive layer disposed respectively against the surface of the first electrode. The first conducting layer or electrode is made sufficiently thin so that the adhesion-imparting layer may adhere to the dielectric layer through pores of the first electrically conductive layer. The result is that the covering foil, adhesion-imparting layer, first electrically conductive layer and dielectric adhere together and are hermetically joined to eliminate the possibility of moisture entering into the vicinity of the first electrode to cause harmful corrosion.

3 Claims, 1 Drawing Figure

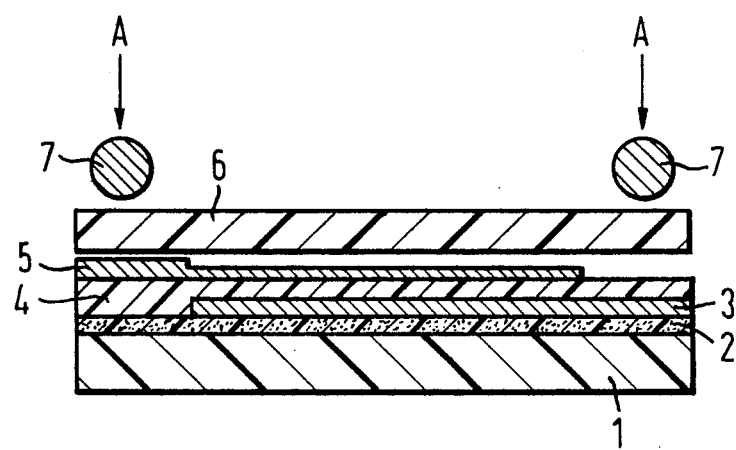

METHOD OF MAKING A CAPACITOR

BACKGROUND OF THE INVENTION

1. Field of the Invention

The field of art to which this invention pertains is stack or layer capacitors with means to prevent corrosion of the electrodes and in particular, to use of adhesion means between one of the electrodes and a covering foil.

2. Description of the Prior Art

Prior art capacitors of the type which are subject to corrosion which the present invention is designed to prevent are shown in the U.S. Pat. No. 3,857,074. With such capacitors corrosion of metallic coatings takes place in high moisture environments.

SUMMARY OF THE INVENTION

It is an important feature of the present invention to provide an improved layer type capacitor.

It is another object of the present invention to provide a layer type capacitor having means for eliminating corrosion of the electrodes. It was surprising to discover that this corrosion does not occur at the exposed portions of the second electrically conductive layer but at the portions of the first electrically conductive layer which are contacted by the dielectric. In these areas the moisture becomes trapped and the corrosion is more of a problem. Therefore is an important object of the present invention to provide a layer type capacitor having an adhesion-imparting layer disposed between a first covering layer and an electrically conducting layer contacting the first covering layer.

It is a additional object of the present invention to provide a capacitor as described above which includes an adhesion-imparting layer and an electrically conducting layer being of a predetermined thickness to permit a solvent contained in the dielectric which is disposed between the electrodes to penetrate through the electrode to the adhesion-imparting layer.

It is also an object of the present invention to provide a method for producing a capacitor of the layer type which includes the steps of coating an adhesion-imparting layer in a dissolved state onto a covering layer of the capacitor, then applying a conductive electrode layer to the adhesion-imparting layer and coating the conductive layer with a dielectric lacquer solution having a solvent therein which is allowed to penetrate through the pores of the first electrode to activate the adhesion layer.

It is a further object of the present invention to provide a method as described above which includes adding a hardening glue to the adhesion-imparting layer.

These and other objects, features and advantages of the present invention will be understood in greater detail from the following description and associated drawing wherein reference numerals are utilized to designate a preferred embodiment.

BRIEF DESCRIPTION OF THE DRAWING

The single FIGURE in this case is a greatly enlarged cross section of a layer capacitor. According to the present invention showing the covering foils and the metalized electrodes together with the arrangement of the adhesion-imparting layer and the dielectric material which forms an hermetically sealed coating for the electrode.

DESCRIPTION OF THE PREFERRED EMBODIMENT

The present invention relates to an electrical stack or layer capacitor in which two conductive coatings forming electrodes of opposite polarity and one or several dielectric layers adhere together and are hermetically connected with at least one covering foil, and in which a second covering foil adheres by way of connecting elements to the dielectric layers, the coatings, and the first covering foil, whereby the adherence only is in the zone of the connecting elements.

The present invention protects the conductive coating adhering to the one covering foil, known as the base coating, from corrosion.

This problem is solved in the case of a capacitor of the above described kind in that between the base coating and the first covering foil, and adhesion-imparting layer is arranged which does not adhere to the covering foil but which adheres to and is also hermetically connected with the dielectric in the area of the free edge and also through the pores of the base coating.

The structure according to the invention has the advantage that the dielectric cannot come loose from the metallized covering foil so that moisture cannot penetrate by capillary condensation between the base coating and the dielectric. The adhesive layer preferably has a thickness of 0.1 to $2/\mu$m.

An advantageous embodiment of the invention is an arrangement wherein the first covering foil consists of polyethylene terephthalate, the adjacent dielectric being derived from the group consisting of polystyrene, polycarbonate or polysulfone, and the adhesion-imparting layer being polyphenylene oxide. The polyphenylene oxide has the required adhesive strength to connect with the polyethylene therephthalate after it is partially dissolved by solvents from the dielectric material. In this embodiment the adhesive-layer preferably has a thickness of 0.2 to 0.4 $\mu$m.

A capacitor structure according to the invention is advantageously produced by coating the adhesion-imparting layer in a dissolved state onto the first covering foil. After the application of a first metal coating which is the "base coating", the dielectric layer in the form of a lacquer solution is coated thereon, this lacquer solution activates the adhesion-imparting layer through the pores of the base coating. A further improvement of the adhesion is achieved by adding a hardening glue to the adhesion-imparting layer in a concentration which does not prevent the adhesion-imparting layer from being deactivated when the dielectric layer is coated.

Referring to the drawings in greater detail, an adhesion-imparting layer 2 is disposed on a first covering foil 1. The layer 2 is coated by the base coating 3 which is applied by means of metal vaporizaton. The base coating 3 is coated with a dielectric layer 4 which, in turn, is coated with a conductive layer electrode of opposite polarity to the coating 3. The adhesion-imparting layer adheres to and is hermetically connected with the first covering foil (1) and is activated by the solvent of the dielectric layer through the base coating 3, which means that it adheres to and is hermetically connected with these layers as well. The second conductive layer 5 is exposed and is protected against mechanical damage only by the second covering foil 6 located thereabove. The second covering foil 6 is connected to said layers and said first covering foil 1 by leads 7, after they are heated and in direction A pressed through said second covering foil 6 and said layers 2, 3, 4, 5 into said first covering foil 1. It is clear that this principle of using an adhesion layer in this manner can be applied to multiple layer capacitors as well as in the single arrangement shown above.

We claim as our invention:

1. A method for producing a layer type capacitor comprising the steps of coating an adhesion-imparting layer in a dissolved state onto a first covering foil, applying a first conductive layer with pores therein into the exposed surface of said adhesion-imparting layer, coating the exposed surface of the first conductive layer with a dielectric lacquer solution having a solvent therein, said adhesion-imparting layer being soluble in said solvent, allowing the solvent to penetrate through the pores of the first conductive layer to activate the adhesion layer, and applying a second conductive layer on said dielectric, applying a second covering foil and contacting said conductive layers on opposite sides by pressing heated leads at least at one point through said covering foil and the respective of said layers into said first covering foil.

2. A method for producing a layer type capacitor in accordance with claim 1 wherein the hardening glue is added to the adhesion-imparting layer in a concentration which does not prevent activation of said adhesion-imparting layer by penetration of the dielectric solvent through the pores of the first conductive layer.

3. Electrical capacitor produced according to claim 1, wherein said first covering foil consists of polyethylene terephthalate, said adhesion-imparting layer is formed of polyphenylene oxide and the dielectric is formed of a material selected from the group consisting of polystyrene, polycarbonate or polysulfone.

* * * * *